United States Patent
Chan

(10) Patent No.: US 10,587,199 B1
(45) Date of Patent: Mar. 10, 2020

(54) POWER SUPPLY CIRCUIT WHICH REDUCES LIGHT-LOAD POWER CONSUMPTION WHILE MAINTAINING STABLE OUTPUT

(71) Applicant: ACER INCORPORATED, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/407,193

(22) Filed: May 9, 2019

(30) Foreign Application Priority Data

Mar. 8, 2019 (TW) .............................. 108107775 A

(51) Int. Cl.
*H02M 3/335* (2006.01)
*H02M 1/00* (2006.01)
*H02M 1/08* (2006.01)

(52) U.S. Cl.
CPC ......... *H02M 3/33523* (2013.01); *H02M 1/08* (2013.01); *H02M 2001/0009* (2013.01); *H02M 2001/0035* (2013.01)

(58) Field of Classification Search
CPC ......... H02M 3/33523; H02M 3/33507; H02M 2001/0035; H02M 2001/0009
See application file for complete search history.

(56) References Cited

U.S. PATENT DOCUMENTS

| 6,292,376 B1* | 9/2001 | Kato ................. H02M 3/33507 363/21.01 |
| 7,385,832 B2* | 6/2008 | Allinder ............ H02M 3/33592 363/127 |
| 8,885,364 B2* | 11/2014 | Wang ................ H02M 3/33523 363/21.15 |
| 9,368,961 B2 | 6/2016 | Espino |

(Continued)

FOREIGN PATENT DOCUMENTS

| CN | 108258912 A | 7/2018 |
| CN | 105490541 B | 8/2018 |

(Continued)

*Primary Examiner* — Jeffrey A Gblende
*Assistant Examiner* — Sisay G Tiku
(74) *Attorney, Agent, or Firm* — Winston Hsu

(57) ABSTRACT

A power supply circuit includes a transformer, two load-monitoring circuits, a pulse-width modulation integrated circuit, and a burst mode control circuit. The first load-monitoring circuit is disposed on the primary side of the transformer for detecting a first current flowing through the primary side, thereby providing a corresponding first detecting voltage. The first load-monitoring circuit is configured to conduct or cut off the first current according to a control signal. The pulse-width modulation integrated circuit is configured to provide the control signal according to the first detecting voltage. The second load-monitoring circuit is disposed on the secondary side of the transformer for detecting a second current flowing through the secondary side, thereby providing a corresponding second detecting voltage. The burst mode control circuit is configured to adjust the value of the first detecting voltage according to the second detecting voltage.

19 Claims, 5 Drawing Sheets

(56) References Cited

U.S. PATENT DOCUMENTS

| | | | | |
|---|---|---|---|---|
| 2003/0042879 A1* | 3/2003 | Huh | ............... | H02M 3/33523 |
| | | | | 323/282 |
| 2015/0280573 A1* | 10/2015 | Gong | ............... | H02M 3/33523 |
| | | | | 363/21.14 |
| 2015/0303816 A1* | 10/2015 | Tumminaro | ............ | H02M 1/08 |
| | | | | 363/21.04 |
| 2015/0357925 A1* | 12/2015 | Tsou | ............... | H02M 3/33507 |
| | | | | 363/21.15 |
| 2016/0028314 A1* | 1/2016 | Kong | ............... | H02M 3/33507 |
| | | | | 363/21.12 |
| 2016/0056704 A1* | 2/2016 | Deboy | ............. | H02M 3/33592 |
| | | | | 363/21.13 |
| 2016/0344294 A1* | 11/2016 | Zhang | ............ | H02M 1/36 |
| 2017/0214322 A1* | 7/2017 | Lin | ............... | H02M 3/33576 |
| 2017/0302157 A1* | 10/2017 | Lin | ............... | H02M 1/08 |
| 2017/0338746 A1* | 11/2017 | Chen | ............. | H02M 1/08 |
| 2018/0139811 A1 | 5/2018 | Ekbote | | |

FOREIGN PATENT DOCUMENTS

| | | |
|---|---|---|
| TW | 201806296 A | 2/2018 |
| TW | 201828583 A | 8/2018 |

\* cited by examiner

POWER SUPPLY CIRCUIT WHICH REDUCES LIGHT-LOAD POWER CONSUMPTION WHILE MAINTAINING STABLE OUTPUT

CROSS REFERENCE TO RELATED APPLICATION

This application claims priority of Taiwan Application No. 108107775 filed on 2019 Mar. 8.

BACKGROUND OF THE INVENTION

1. Field of the Invention

The present invention is related to a power supply circuit capable of reducing light-load power consumption, and more particularly, to a power supply circuit capable of reducing light-load power consumption while maintaining stable output.

2. Description of the Prior Art

The unlimited extraction of natural resources and the consequences of overlooking the environmental costs of such behavior have made more and more people aware of the importance of eco-design measures. Many frameworks have been established for the setting of eco-design requirements for energy-using products, such as televisions, computers, fans, lighting, or for Products which do not use energy but indirectly impact energy consumption, such as windows and faucets among others. For example, the EU Ecodesign Directive covers all energy-related products sold in the domestic, commercial and industrial sectors, wherein battery chargers and external power supplies are regulated by Lot 7 EC 278/2009 which states that the input power should not exceed 0.5 W when the output power is 0.25 W. The Office of Energy Efficiency and Renewable Energy in the United States Department of Energy (DoE) also makes similar efforts to develop and deploy energy efficient solutions.

Many power supply circuits adopt a switch-mode design in order to meet the requirement of low stand-by loss. The switching loss is closely related to the switching frequency of power supply circuits. Although high-frequency operation allows a power supply circuit to adopt smaller energy-storage devices (such as capacitors and inductors), but it causes larger switching loss. A compromise between device size and energy loss may be made by lowering the switching frequency of the power supply circuit in light-load and no-load conditions.

A prior art power supply circuit normally includes a transformer, a feedback circuit, and a pulse width modulation integrated circuit and is configured to performed the above-mention down-clocking function using a burst mode design. When a light-load condition is determined by the feedback circuit, the pulse width modulation integrated circuit is configured to increase the turn-on period in the control signal, thereby decreasing the frequency of the output voltage and thus reducing power consumption. However, since the feedback circuit is disposed on the primary side of the transformer in the prior art power supply circuit, it requires a certain response time to detect the load variation on the secondary side of the transformer. Sudden load changes may also cause the output voltage to drop. Therefore, there is a need for a power supply circuit capable of reducing light-load power consumption while maintaining stable output.

SUMMARY OF THE INVENTION

The present invention provides a power supply circuit which includes a main transformer, a first load-monitoring circuit, a pulse width modulation integrated circuit, a second load-monitoring circuit, and a burst mode control circuit. The main transformer includes a primary side for receiving an input voltage and a secondary side for providing an output voltage. The first load-monitoring circuit is disposed on the primary side of the main transformer and configured to detect a first current flowing through the primary side of the main transformer for providing a corresponding first detecting voltage, and conduct or cut off a path of the first current according to a first control signal. The pulse width modulation integrated circuit is configured to provide the first control signal according to the first detecting voltage. The second load-monitoring circuit is disposed on the secondary side of the main transformer and configured to detect a second current flowing through the secondary side of the main transformer for providing a corresponding second detecting voltage. The burst mode control circuit is configured to adjust the first detecting voltage according to the second detecting voltage.

The present invention also provides a power supply circuit which includes a main transformer, a load-monitoring circuit, a pulse width modulation integrated circuit, and a burst mode control circuit. The main transformer includes a primary side for receiving an input voltage, and a secondary side for providing an output voltage. The load-monitoring circuit is disposed on the secondary side of the main transformer and configured to detect a first current flowing through the secondary side of the main transformer for providing a corresponding first detecting voltage. The pulse width modulation integrated circuit is configured to provide a first control signal according to a second detecting voltage associated with a second current flowing through the primary side of the main transformer. The burst mode control circuit is configured to adjust the second detecting voltage according to the first detecting voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
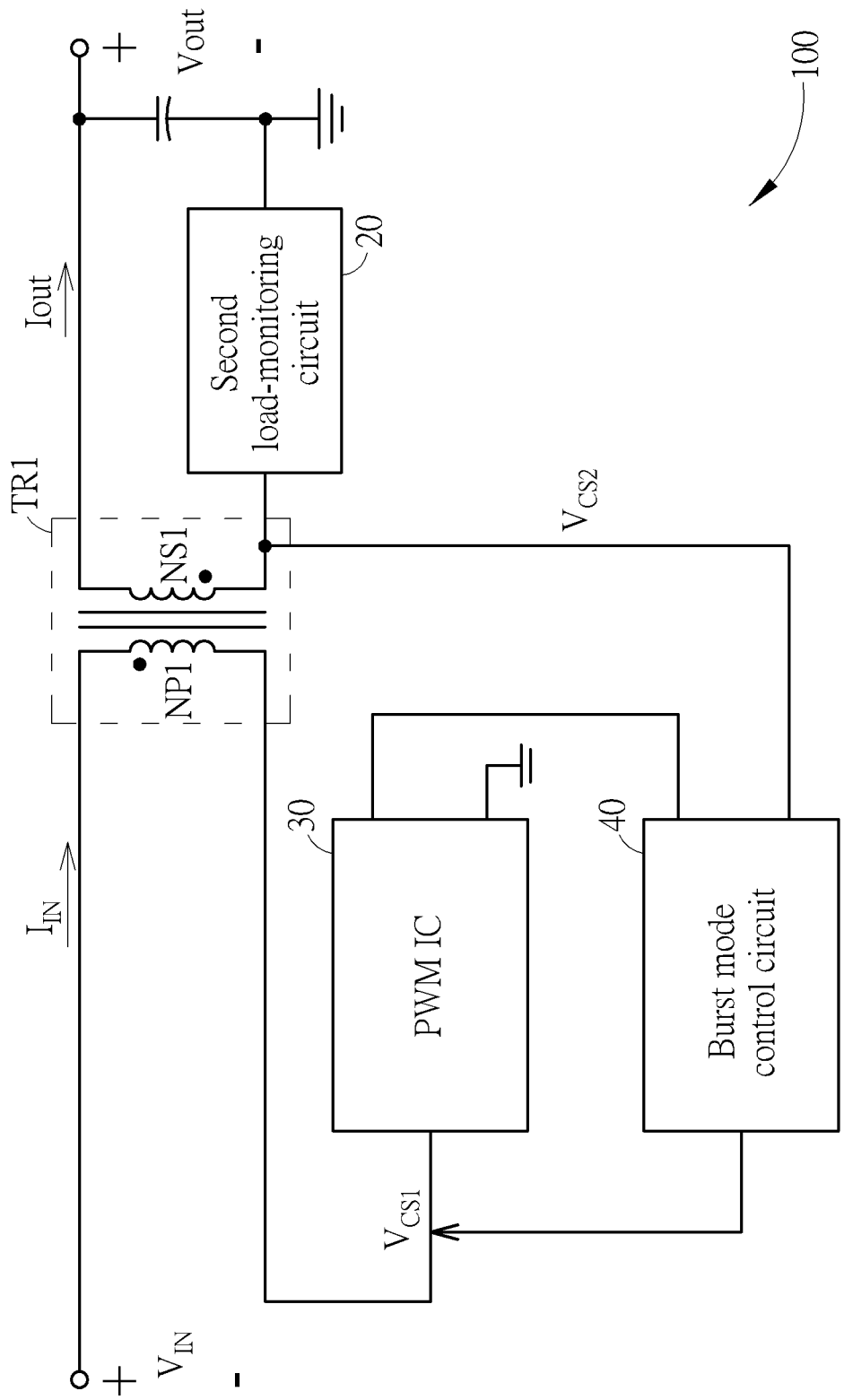
FIG. 1 is a functional diagram illustrating a power supply circuit according to an embodiment of the present invention.

FIG. 1 is a functional diagram illustrating a power supply circuit 100 according to an embodiment of the present invention. The power supply circuit 100 includes a main transformer TR1, a second load-monitoring circuit 20, a pulse width modulation integrated circuit 30, and a burst mode control circuit 40. The power supply circuit 100 is configured to convert an input voltage $V_{IN}$ to an output voltage $V_{OUT}$ for driving a load 50. The second load-monitoring circuit 20 is disposed on the secondary side of the main transformer TR1 (represented by NS1) and configured to detect the current $I_{OUT}$ flowing through the secondary side of the main transformer TR1 (represented by NSP1) for providing a corresponding detecting voltage $V_{CS2}$. The pulse width modulation integrated circuit 30 is configured to provide a control signal S1 according to a detecting voltage $V_{CS1}$ associated with the current $I_{IN}$ flowing through the primary side of the main transformer TR1. The burst mode control circuit 40 is configured to adjust the detecting voltage $V_{CS1}$ according to the detecting voltage $V_{CS2}$.

Figure 2:
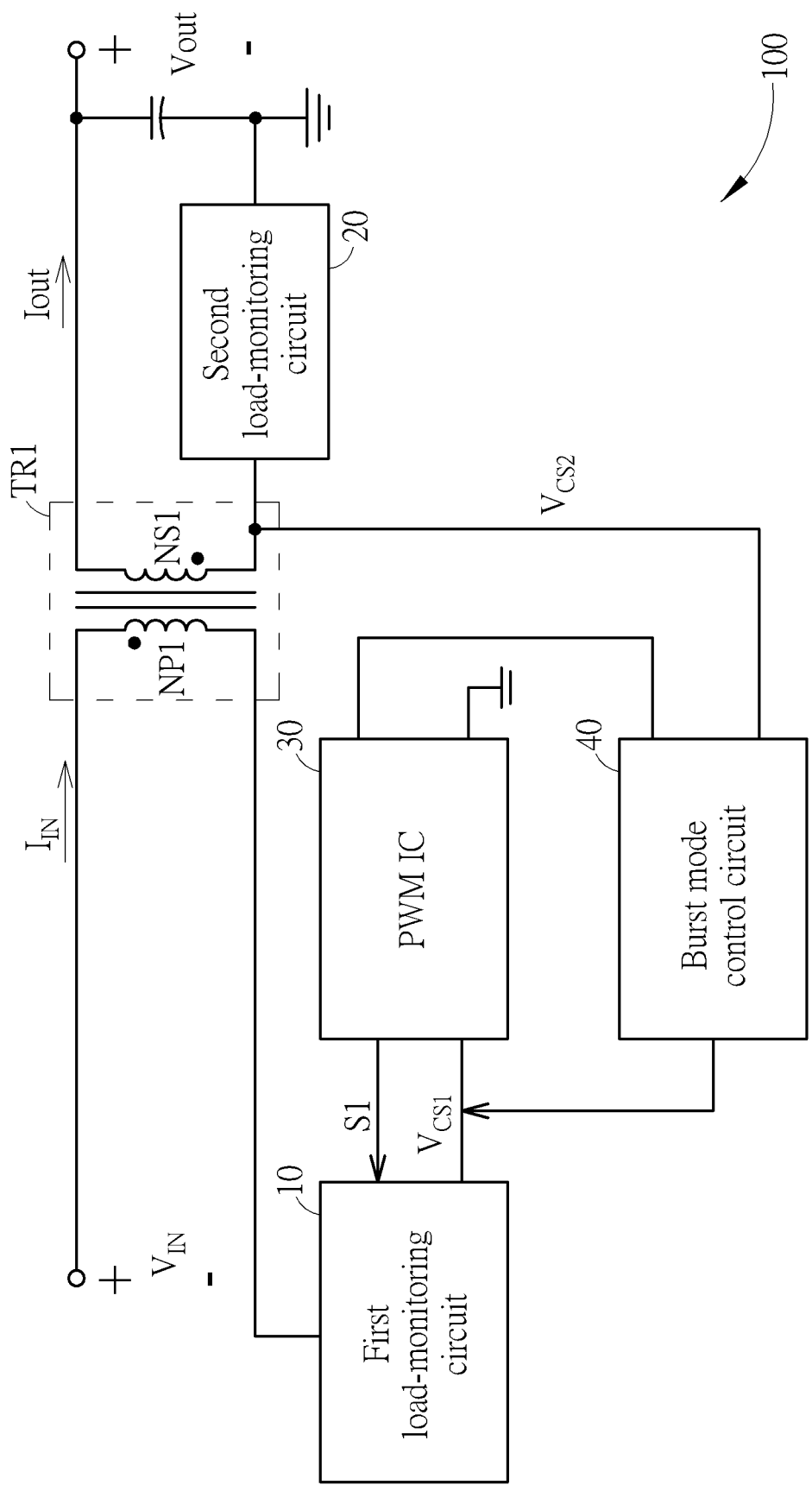
FIG. 2 is a functional diagram illustrating a power supply circuit according to another embodiment of the present invention.

FIG. 2 is a functional diagram illustrating the power supply circuit 100 according to another embodiment of the present invention. In this embodiment, the power supply circuit 100 further includes a first load-monitoring circuit 10 disposed on the primary side of the main transformer TR1 and configured to detect the current $I_{IN}$ flowing through the primary side of the main transformer TR1 for providing the detecting voltage $V_{CS1}$. The first load-monitoring circuit 10 is also configured to conduct or cut off the path of the current $I_{IN}$ according to the control signal S1 generated by the pulse width modulation integrated circuit 30.

Figure 3:
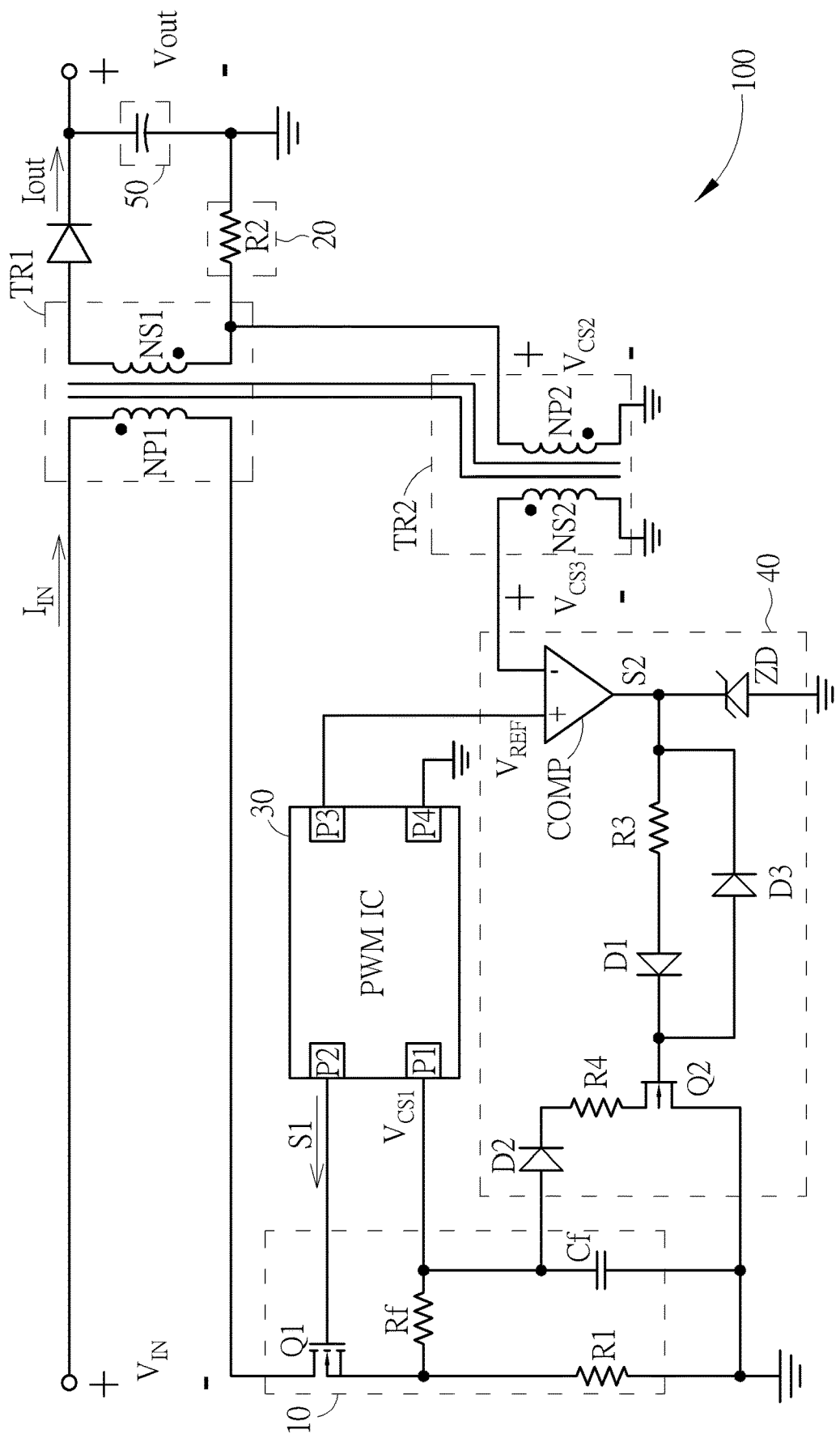
FIG. 3 is a diagram illustrating an implementation of a power supply circuit according to an embodiment of the present invention.

FIG. 3 is a diagram illustrating an implementation of the power supply circuit 100 according to an embodiment of the present invention. The main transformer TR1 includes a primary winding (NP1 turns) coupled to the input voltage $V_{IN}$ and a secondary winding (NS1 turns) coupled to the load 50, wherein $I_{IN}$ represents the input current flowing through the primary side of the main transformer TR1, and $I_{OUT}$ represents the output current flowing through the secondary side of the main transformer TR1. Base on Faraday's law of induction, the operation of an ideal transformer may be described by an equation of $V_{IN}/V_{OUT}=I_{OUT}/I_{IN}=NP1/NS1$. In step-up applications, the number of turns in the secondary winding NS1 is larger than the number of turns in the primary winding NP1. In step-down applications, the number of turns in the primary winding NP1 is larger than the number of turns in the secondary winding NS1. However, the number of turns in the primary or second winding does not limit the scope of the present invention.

The pulse width modulation integrated circuit 30 includes 4 pins P1-P4, wherein Pin P1 is used to receive a detecting voltage $V_{CS1}$, Pin P2 is used to output a control signal S1, Pin P3 is used to output a reference voltage $V_{REF}$, and Pin P4 is coupled to a ground voltage. The pulse width modulation integrated circuit 30 is configured to adjust the length of turn-off period in the control signal S1 according to the detecting voltage $V_{CS1}$.

The first load-monitoring circuit 10 is disposed on the primary side of the main transformer TR1 and includes a first sensing resistor R1, a resistor Rf, a capacitor Cf, and a power switch Q1. With its control end coupled to Pin P2 of the pulse width modulation integrated circuit 30, the power switch Q1 is configured to conduct or cut off the path of the input current $I_{IN}$ according to the control signal S1. When the primary side input current $I_{IN}$ flows through the power switch Q1 and the sending resistor R1, the detecting voltage $V_{CS}$ is established and then input to Pin P1 of the pulse width modulation integrated circuit 30 via a filter formed by the resistor Rf and the capacitor Cf. When the detecting voltage $V_{CS}$ is larger than a predetermined voltage, it is determined that the load 50 is a heavy load, and the pulse width modulation integrated circuit 30 is configured to output the control signal S1 with a shorter turn-off period via Pin P2; when the detecting voltage $V_{CS}$ is not larger than the predetermined voltage, it is determined that the load 50 is a light load, and the pulse width modulation integrated circuit 30 is configured to activate the down-clocking function by increasing the turn-off period of the control signal S1, thereby allowing the power supply circuit 100 to operate in a burst mode.

Figure 4A:
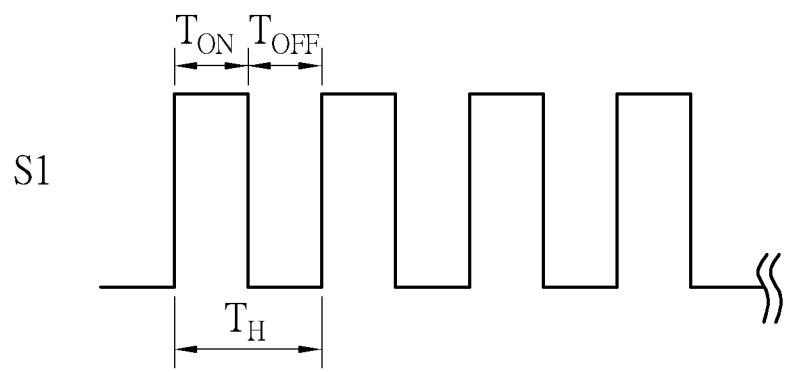
FIG. 4A is a diagram illustrating the operations of the first load-monitoring circuit in the power supply circuit 100 according to an embodiment of the present invention.
Figure 4B:
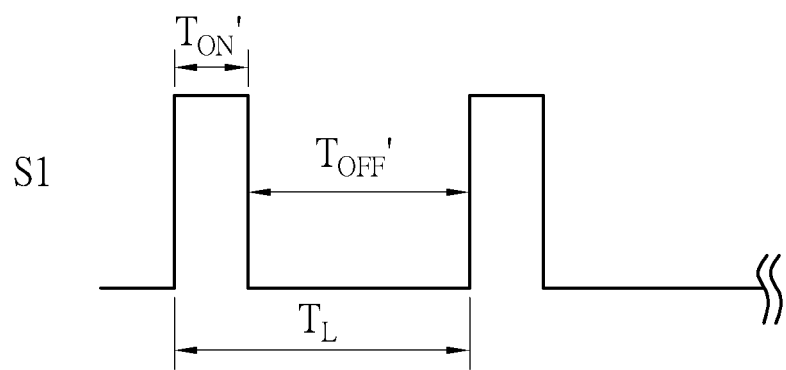
FIG. 4B is a diagram illustrating the operations of the first load-monitoring circuit in the power supply circuit 100 according to another embodiment of the present invention.

FIGS. 4A and 4B are diagrams illustrating the operations of the first load-monitoring circuit 10 in the power supply circuit 100 according to embodiments of the present invention. FIG. 4A depicts the waveform of the control signal S1 in a heavy-load condition, wherein $T_H$ represents the length of each driving cycle, and each driving cycle includes a turn-on period $T_{ON}$ and a turn-off period $T_{OFF}$. FIG. 4B depicts the waveform of the control signal S1 in a light-load condition, wherein $T_L$ represents the length of each driving cycle, and each driving cycle includes a turn-on period $T_{ON}'$ and a turn-off period $T_{OFF}'$. During the turn-on periods $T_{ON}$ and $T_{ON}'$ when the control signal S1 is at an enable level, the power switch Q1 disposed on the primary side of the main transformer TR1 is conducting, and the output voltage $V_{OUT}$ and the output current $I_{OUT}$ are provided on the secondary side of the main transformer TR1. During the turn-off periods $T_{OFF}$ and $T_{OFF}'$ when the control signal S1 is at a disable level, the power switch Q1 disposed on the primary side of the main transformer TR1 is not conducting, and there is no output on the secondary side of the main transformer TR1 (the output voltage $V_{OUT}$ and the output current $I_{OUT}$ are substantially 0). As previously stated, the first load-monitoring circuit 10 disposed on the primary side of the main transformer TR1 is configured to activate the down-clocking function when determining the load 50 as a light load ($T_L>T_H$), thereby allowing the turn-off period $T_{OFF}'$ to be larger than the turn-off period $T_{OFF}$. Under such circumstance, the control signal S1 provided in the light-load condition has a shorter overall turn-on time and a lower switching frequency between turn-on and turn-off periods, thereby reducing the switching loss of the power switch Q1 in the light-load condition.

In an embodiment of the present invention, the second load-monitoring circuit 20 is disposed on the secondary side of the main transformer TR1 and includes a second sensing resistor R2 arranged to detect the output current $I_{OUT}$ on the secondary side of the main transformer TR1, thereby providing a corresponding detecting voltage $V_{CS2}$. The auxiliary transformer TR2 includes a primary winding (NP2 turns) coupled to the detecting voltage $V_{CS2}$ and a secondary winding (NS2 turns) coupled to the burst mode control circuit 40, wherein NS2>NP2. The auxiliary transformer TR2 is configured to provide a detecting voltage $V_{CS3}$ by boosting the detecting voltage $V_{CS2}$, wherein $V_{CS3}/V_{CS2}$=NS2/NP2.

The burst mode control circuit 40 includes a comparator COMP, diodes D1~D3, a Zener diode ZD, resistors R3-R4, and an auxiliary switch Q2. The comparator COMP includes a positive input end coupled to Pin P3 of the pulse width modulation integrated circuit 30 for receiving the reference voltage $V_{REF}$, a negative input end coupled to the secondary side of the auxiliary transformer TR2 for receiving the detecting voltage $V_{CS3}$, and an output end coupled to the cathode of the Zener diode ZD. The diode D1 includes an anode coupled to the output end of the comparator COMP via the resistor R3, and a cathode coupled to the control end of the auxiliary switch Q2. The diode D2 includes an anode coupled to Pin P1 of the pulse width modulation integrated circuit 30 and a cathode coupled to the first end of the auxiliary switch Q2 via the resistor R4. The second end of the auxiliary switch Q2 and the anode of the Zener diode ZD are coupled to the ground voltage. The diode D3 includes an anode coupled to the control end of the auxiliary switch Q2 and a cathode coupled to the output end of the comparator COMP. The diode D3 is arranged to provide a discharge path through which the voltage stored on the parasitic capacitance of the auxiliary switch Q2 may be discharged to the ground voltage.

When the power supply circuit 100 operates in the burst mode, the second load-monitoring circuit 20 may directly monitor the variation of the output current $I_{OUT}$ on the secondary side of the main transformer TR1. When the detecting voltage $V_{CS3}$ associated with the detecting voltage $V_{CS2}$ boosted by the auxiliary transformer TR2 is larger than the reference voltage $V_{REF}$, the comparator is configured to output the control signal S2 having a disable level for deactivating the burst mode control circuit 40, and the pulse width modulation integrated circuit 30 is configured to switch the operational mode of the power supply circuit 100 according to the detecting voltage $V_{CS1}$ provided by the first load-monitoring circuit 10.

When the load 50 drops to a value and the corresponding detecting voltage $V_{CS3}$ is no longer larger than the reference voltage $V_{REF}$, the comparator is configured to output the control signal S2 having an enable level so that the Zener diode ZD is reverse-biased and provides a breakdown voltage (such as 15V), thereby conducting the auxiliary switch Q2 via the discharge path formed by the resistor R3 and the diode D1. When the auxiliary switch Q2 is conducting, the level of Pin P1 of the pulse width modulation integrated circuit 30 is pulled down via the discharge path formed by the resistor R4 and the diode D2. Therefore, it takes longer for the detecting voltage $V_{CS1}$ to reach the exit point of the burst mode (when the detecting voltage $V_{CS1}$ is larger than the predetermined voltage), thereby reducing power consumption by allowing the power supply circuit 100 to operate in the burst mode range with increased time.

Figure 5A:
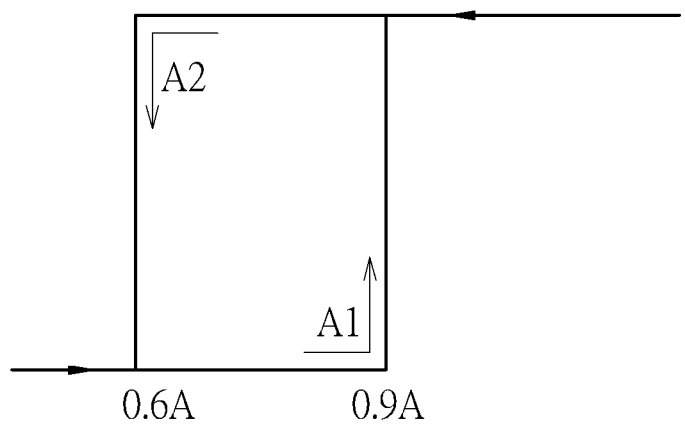
FIG. 5A is a diagram illustrating the operations of the second load-monitoring circuit in the power supply circuit according to an embodiment of the present invention.
Figure 5B:
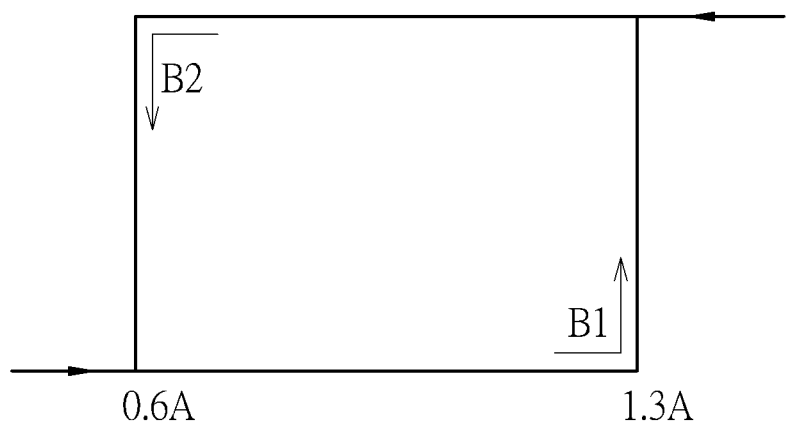
FIG. 5B is a diagram illustrating the operations of the second load-monitoring circuit in the power supply circuit according to another embodiment of the present invention.

FIGS. 5A and 5B are diagrams illustrating the operations of the second load-monitoring circuit 20 in the power supply circuit 100 according to embodiments of the present invention. FIG. 5A depicts the waveform of the output current $I_{OUT}$ when the burst mode control circuit 40 is deactivated, and FIG. 5B depicts the waveform of the output current $I_{OUT}$ when the burst mode control circuit 40 is activated. As depicted in FIG. 5A, when the output current $I_{OUT}$ is not larger than 0.6 A, it is determined by the first load-monitoring circuit 10 disposed on the primary side of the main transformer TR1 that the load 50 is a light load, and the power supply circuit 100 switches from the normal mode to the burst mode (represented by arrow A2); when the output current $I_{OUT}$ is larger than 0.9 A, it is determined by the first load-monitoring circuit 10 disposed on the primary side of the main transformer TR1 that the load 50 is a heavy load, and the power supply circuit 100 switches from the burst mode to the normal mode (represented by arrow A1). As depicted in FIG. 5B, when it is determined by the first load-monitoring circuit 10 disposed on the primary side of the main transformer TR1 and the second load-monitoring circuit 20 disposed on the secondary side of the main transformer TR1 that the load 50 is a light load, the burst mode control circuit 40 is configured to pull down the level of Pin P1 of the pulse width modulation integrated circuit 30 for increasing the time when the power supply circuit 100 operates in the burst mode. Under such circumstance, the power supply circuit 100 switches from the burst mode to the normal mode when the output current $I_{OUT}$ is larger than 1.3 A (represented by arrow B). As depicted in FIGS. 3A and 3B, the activation of the burst mode control circuit 40 increases the burst Mode range from 0.3 A to 0.7 A in the light-load condition, thereby further reducing power consumption.

In conclusion, the present power supply circuit 100 adopts two load-monitoring circuits for detecting load variations. The frequency of the output voltage may be decreased in the light-load condition for reducing power consumption. Since the second load-monitoring circuit is disposed on the secondary side of the main transformer, it can provide real-time response to load variations and stabilize output voltage when the down-clocking function is activated.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power supply circuit, comprising:
   a main transformer, comprising:
      a primary side for receiving an input voltage; and
      a secondary side for providing an output voltage;
   a first load-monitoring circuit disposed on the primary side of the main transformer and configured to:
      detect a first current flowing through the primary side of the main transformer for providing a corresponding first detecting voltage; and
      conduct or cut off a path of the first current according to a first control signal;
   a pulse width modulation integrated circuit configured to provide the first control signal according to the first detecting voltage;
   a second load-monitoring circuit disposed on the secondary side of the main transformer and configured to detect a second current flowing through the secondary side of the main transformer for providing a corresponding second detecting voltage; and
   a burst mode control circuit configured to adjust the first detecting voltage according to the second detecting voltage, and comprising:
      a comparator, comprising:
         a positive input end coupled to the pulse width modulation integrated circuit for receiving a reference voltage;
         a negative input end for receiving a third detecting voltage associated with the second detecting voltage; and an output end for outputting a second control signal according to a relationship between the third detecting voltage and the reference voltage;
a Zener diode, comprising:
an anode coupled to a ground voltage; and
a cathode coupled to the output end of the comparator;
a first resistor and a second resistor:
a first diode, comprising:
an anode coupled to the output end of the comparator via the first resistor; and
a cathode:
a second diode, comprising:
an anode coupled to the first detecting voltage; and
a cathode; and
an auxiliary switch, comprising:
a first end coupled to the cathode of the second diode via the second resistor:
a second end coupled to the ground voltage; and
a control end coupled to the cathode of the first diode.

2. The power supply circuit of claim 1, wherein the first load-monitoring circuit includes:
a power switch, comprising:
a first end coupled to the primary side of the main transformer;
a second end; and
a control end coupled to the pulse width modulation integrated circuit for receiving the first control signal; and
a first sensing resistor coupled between the second end of the power switch and a ground voltage.

3. The power supply circuit of claim 2, wherein the first load-monitoring circuit further includes:
a third resistor, comprising:
a first end coupled between the second end of the power switch and the first sensing resistor; and
a second end coupled to the pulse width modulation integrated circuit; and
a capacitor, comprising:
a first end coupled between the second end of the third resistor and the pulse width modulation integrated circuit; and
a second end coupled to the ground voltage.

4. The power supply circuit of claim 1, wherein the second load-monitoring circuit includes a second sensing resistor.

5. The power supply circuit of claim 1, wherein the burst mode control circuit further includes:
a third diode, comprising:
an anode coupled to the control end of the auxiliary switch; and
a cathode coupled to the output end of the comparator.

6. The power supply circuit of claim 1, further comprising an auxiliary transformer configured to provide the third detecting voltage by boosting the second detecting voltage.

7. The power supply circuit of claim 1, wherein:
the comparator is configured to output the second control signal having a disable level for deactivating the burst mode control circuit when the third detecting voltage is larger than the reference voltage; or
the comparator is configured to output the second control signal having an enable level for reverse-biasing the Zener diode when the third detecting voltage is not larger than the reference voltage.

8. The power supply circuit of claim 7, wherein:
the Zener diode which is reverse-biased when the third detecting voltage is not larger than the reference voltage is configured to provide a breakdown voltage which conducts the auxiliary switch via a first discharge path formed by the first resistor and the first diode, thereby lowering the first detecting voltage via a second discharge path formed by the second diode, the second resistor and the auxiliary switch.

9. The power supply circuit of claim 1, wherein the pulse width modulation integrated circuit is further configured to:
provide the first control signal having a first driving cycle when the first detecting voltage is larger than a predetermined voltage; and
provide the first control signal having a second driving cycle when the first detecting voltage is not larger than the predetermined voltage, wherein a length of the first driving cycle is shorter than a length of the second driving cycle and a first turn-off period in the first driving cycle is shorter than a second turn-off period in the second driving cycle.

10. A power supply circuit, comprising:
a main transformer, comprising:
a primary side for receiving an input voltage; and
a secondary side for providing an output voltage;
a first load-monitoring circuit disposed on the secondary side of the main transformer and configured to detect a first current flowing through the secondary side of the main transformer for providing a corresponding first detecting voltage;
a pulse width modulation integrated circuit configured to provide a first control signal according to a second detecting voltage associated with a second current flowing through the primary side of the main transformer; and
a burst mode control circuit configured to adjust the second detecting voltage according to the first detecting voltage, and comprising:
a comparator, comprising:
a positive input end coupled to the pulse width modulation integrated circuit for receiving a reference voltage;
a negative input end for receiving a third detecting voltage associated with the first detecting voltage; and
an output end for outputting a second control signal according to a relationship between the third detecting voltage and the reference voltage;
a Zener diode, comprising:
an anode coupled to a ground voltage; and
a cathode coupled to the output end of the comparator;
a first resistor and a second resistor;
a first diode, comprising:
an anode coupled to the output end of the comparator via the first resistor; and
a cathode:
a second diode, comprising:
an anode coupled to the second detecting voltage; and
a cathode; and
an auxiliary switch, comprising:
a first end coupled to the cathode of the second diode via the second resistor:
a second end coupled to the ground voltage; and
a control end coupled to the cathode of the first diode.

11. The power supply circuit of claim 10, wherein the first load-monitoring circuit includes a first sensing resistor.

12. The power supply circuit of claim 11, wherein the burst mode control circuit further includes:
a third diode, comprising:
an anode coupled to the control end of the auxiliary switch; and
a cathode coupled to the output end of the comparator.

13. The power supply circuit of claim 12, further comprising an auxiliary transformer configured to provide the third detecting voltage by boosting the first detecting voltage.

14. The power supply circuit of claim 12, wherein:
the comparator is configured to output the second control signal having a disable level for deactivating the burst mode control circuit when the third detecting voltage is larger than the reference voltage; or
the comparator is configured to output the second control signal having an enable level for reverse-biasing the Zener diode when the third detecting voltage is not larger than the reference voltage.

15. The power supply circuit of claim 14, wherein:
the Zener diode which is reverse-biased when the third detecting voltage is not larger than the reference voltage is configured to provide a breakdown voltage which conducts the auxiliary switch via a first discharge path formed by the first resistor and the first diode, thereby lowering the second detecting voltage via a second discharge path formed by the second diode, the second resistor and the auxiliary switch.

16. The power supply circuit of claim 10, wherein the pulse width modulation integrated circuit is further configured to:
provide the first control signal having a first driving cycle when the second detecting voltage is larger than a predetermined voltage; and
provide the first control signal having a second driving cycle when the second detecting voltage is not larger than the predetermined voltage, wherein a length of the first driving cycle is shorter than a length of the second driving cycle and a first turn-off period in the first driving cycle is shorter than a second turn-off period in the second driving cycle.

17. The power supply circuit of claim 10, further comprising a second load-monitoring circuit disposed on the primary side of the main transformer and configured to:
detect the second current flowing through the primary side of the main transformer for providing the second detecting voltage; and
conduct or cut off a path of the second current according to the first control signal.

18. The power supply circuit of claim 17, wherein the second load-monitoring circuit includes:
a power switch, comprising:
a first end coupled to the primary side of the main transformer;
a second end; and
a control end coupled to the pulse width modulation integrated circuit for receiving the first control signal;
a second sensing resistor coupled between the second end of the power switch and a ground voltage;
a third resistor, comprising:
a first end coupled between the second end of the power switch and the second sensing resistor; and
a second end coupled to the pulse width modulation integrated circuit; and
a capacitor, comprising:
a first end coupled between the second end of the third resistor and the pulse width modulation integrated circuit; and
a second end coupled to the ground voltage.

19. A power supply circuit, comprising:
a main transformer, comprising:
a primary side for receiving an input voltage; and
a secondary side for providing an output voltage;
a load-monitoring circuit disposed on the secondary side of the main transformer and configured to detect a first current flowing through the secondary side of the main transformer for providing a corresponding first detecting voltage;
a pulse width modulation integrated circuit configured to:
provide a first control signal having a first driving cycle when a second detecting voltage associated with a second current flowing through the primary side of the main transformer is larger than a predetermined voltage; and
provide the first control signal having a second driving cycle when the second detecting voltage is not larger than the predetermined voltage, wherein a length of the first driving cycle is shorter than a length of the second driving cycle and a first turn-off period in the first driving cycle is shorter than a second turn-off period in the second driving cycle; and
a burst mode control circuit configured to adjust the second detecting voltage according to the first detecting voltage.

* * * * *